H. H. HECKMAN.
AUTOMATIC FILM CONTROL.
APPLICATION FILED MAR. 27, 1916.

1,237,333.

Patented Aug. 21, 1917.
2 SHEETS—SHEET 1.

Inventor:
Homer H. Heckman,
by Fetherstonhaugh & Co
Atty's.

H. H. HECKMAN.
AUTOMATIC FILM CONTROL.
APPLICATION FILED MAR. 27, 1916.
1,237,333.
Patented Aug. 21, 1917.
2 SHEETS—SHEET 2.
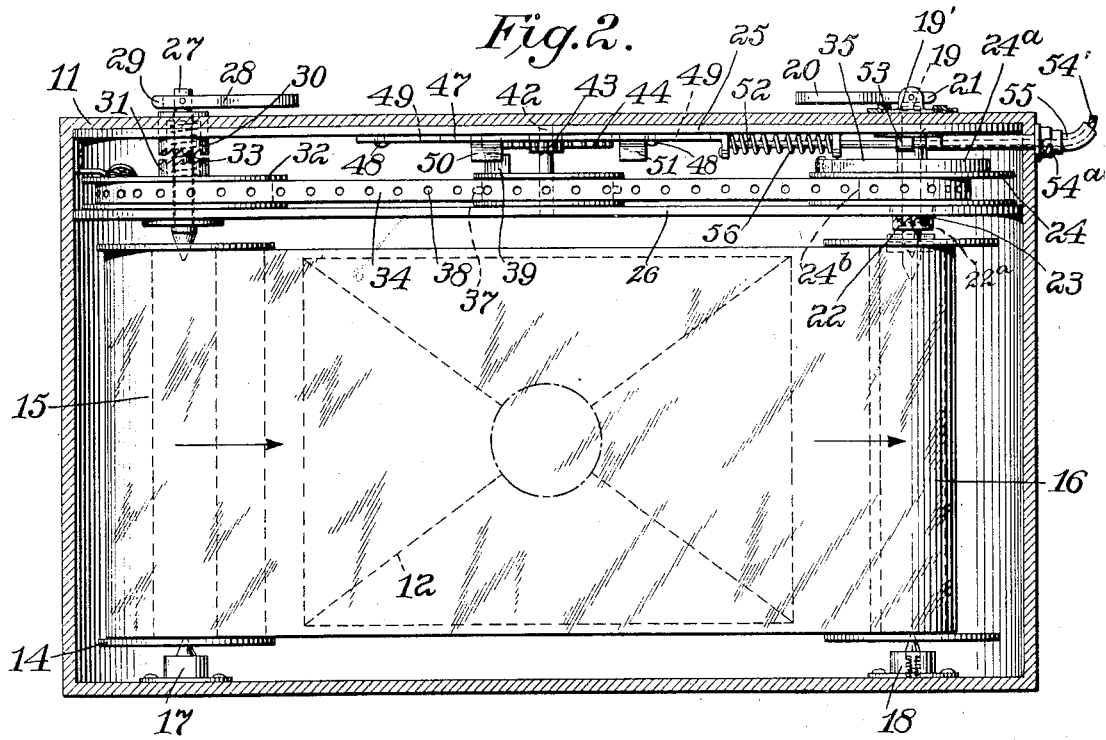
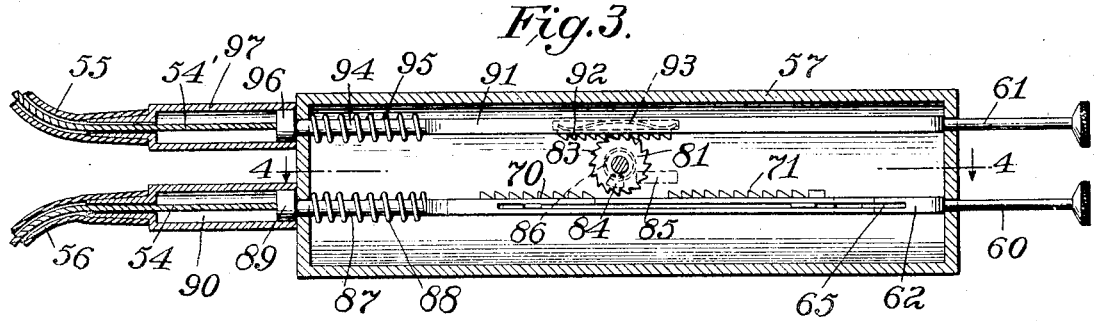
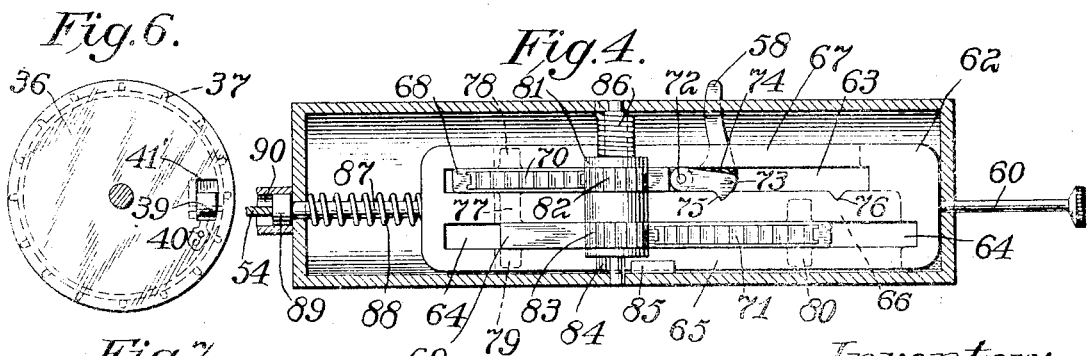
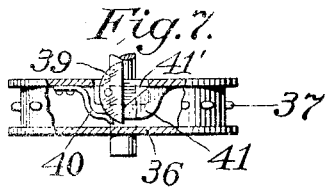
Inventor:
Homer H. Heckman,
by Featherstonhaugh & Co
Attys.

UNITED STATES PATENT OFFICE.

HOMER H. HECKMAN, OF FREEPORT, ILLINOIS, ASSIGNOR OF ONE-THIRD TO R. C. ROWEN, OF FREEPORT, ILLINOIS.

AUTOMATIC FILM CONTROL.

1,237,333.    Specification of Letters Patent.    Patented Aug. 21, 1917.

Application filed March 27, 1916. Serial No. 87,052.

*To all whom it may concern:*

Be it known that I, HOMER H. HECKMAN, a citizen of the United States, residing at Freeport, State of Illinois, have invented a new and useful Improvement in Automatic Film Controls, of which the following is a specification.

This invention relates to devices for the automatic changing of exposed films in cameras to bring an unexposed film into place. The object of the invention is to devise a mechanism that will prevent the double exposure of a film and one that will remove the exposed film from behind the lens and bring an unexposed one into exact picture taking position without having it run beyond as is so often the case with cameras at present in use.

With these objects in view, the invention consists in the arrangement, construction and combination of parts hereinafter described and particularly pointed out in the claims, it being understood that I do not intend to limit myself to the details of construction.

The invention is illustrated in the accompanying drawings in which:

Fig. 2 is a partly sectional rear elevation of the same camera with the back plate removed.

Fig. 3 shows a vertical longitudinal section through my shutter and film operating hand piece.

Fig. 4 is a view of the same parts as Fig. 3 but is a section taken along the line 4—4 of Fig. 3.

Fig. 6 is a plan view of my tape controlling wheel.

Fig. 7 is a partly sectional side elevation thereof.

Figure 1:
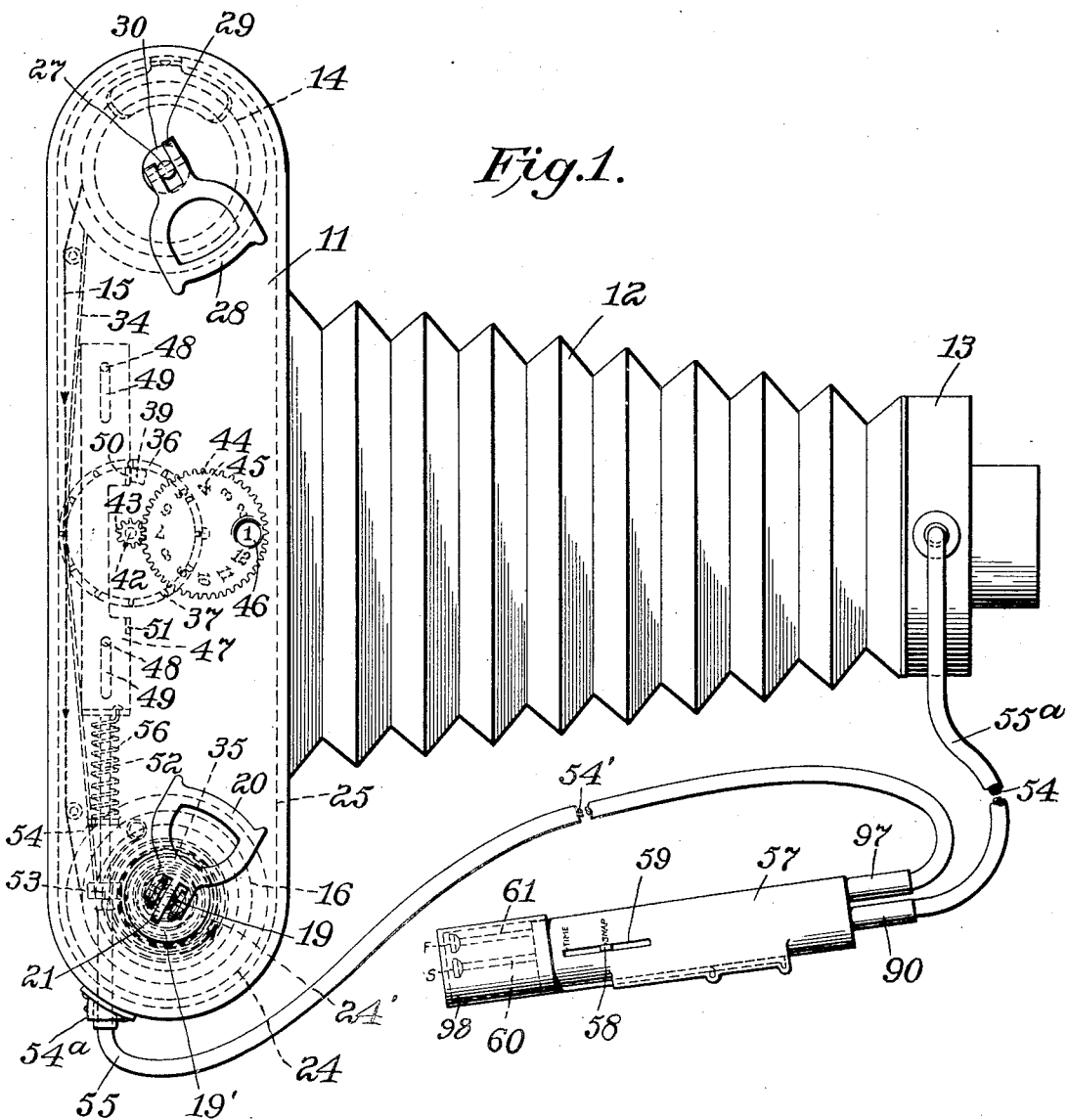
Figure 1 is a plan view of a camera with my invention in place and shown in dotted lines.
Figure 5:
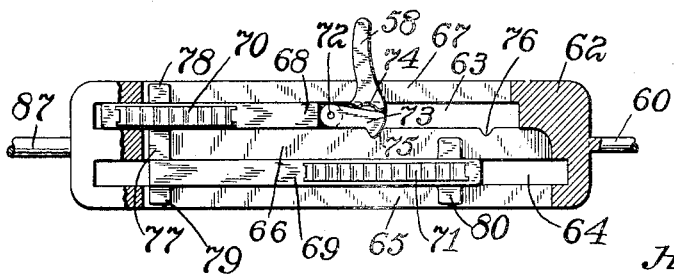
Fig. 5 is a partly sectional plan view of one of the elements of my hand piece.

In the drawings 11 indicates the body portion of a camera, 12 a bellows and 13 the shutter holding frame, 14 a spool, of film 15 just inserted in the camera, 16 an empty spool on which the film is to be wound. 17 and 18 represent the usual spring detents for the spools. 19 indicates a shaft surrounded by a swivel plate 19′ carrying a pivoted handle 20 provided with a finger 21. This shaft extends into the casing of the camera and connects with the spool 16 to turn it. The lower extremity of this shaft is provided with a clutch member 22 adapted to normally co-act with a clutch member 23 depending from a drum 24 carried by a sleeve 24′ surrounding the shaft. A spring 22$^a$ is provided between the clutch members adapted to normally maintain them in contact with each other. The drum 24 is divided into two sections 24$^a$ and 24$^b$, the upper of which, 24$^a$ is adapted to carry a spring 35. 25 and 26 represent upper and lower plates which carry my improved mechanism. 27 indicates a shaft having a pivoted handle 28 with a finger 29. 30 represents a clutch member adapted to co-act with but normally disengaged from a clutch member 31 carried by a drum 32. A spring such as 33 may keep the clutch members apart. This drum 32 is adapted to have wound upon it, a perforated tape 34. Tape 34 is also adapted to be wound upon the drum 24 in the section 24$^b$ and passes over a control wheel 36 journaled intermediate of the drums. This wheel is provided with projecting teeth 37 adapted to engage the perforations 38 of the tape. While I prefer to make the tape of steel, I may use any suitable material. A dog 39 is pivoted in my wheel 36, as shown in Fig. 7, and is maintained in extended position by a spring 40. 41 is a stop for the dog 39 when it is retracted against the pressure of the spring 40. 41′ represents an opening in the top of the wheel 36 through which the dog 39 extends. On the shaft 42 which carries the wheel 36, I place a gear 43 meshing with a larger gear 44 on which I provide numerals 45 which register consecutively with an opening 46 in the top casing of the camera. 47 indicates a slide secured to plate 25 by means of rivets 48 and slots 49. This slide has two depending lugs 50 and 51 for engaging the dog 39 of the wheel 36 on opposite sides of the shaft 42. This slide is operated upon by a stem 52 having a collar 53 therearound operated from a wire containing tube 55. Where the tube 55 enters the camera as at 54$^a$, I provide a detachable connection so that it can be disconnected at this point when the camera is in portable condition. 56 is a spring encircling the stem 52.

The tube 55 from the camera just described and the tube 55$^a$ from the shutter may be made of any flexible material and contain an operating wire or cable 54 therein. They lead to my hand piece 57. 58 indicates an adjusting pin operating in a slot 59 for making either a snap shot or a time exposure. 60 represents a pushing rod for making the exposure and 61 a pushing rod for moving the film.

This hand piece is provided with an exposure making member 62 which comprises a plate having two longitudinal slots 63 and 64 therein, which slots have grooves 65, 66 and 67 extending laterally therefrom. An operating member is adapted to move in the slots 63 and 64 which comprises two arms 68 and 69 of unequal length. 70 represents a toothed rack carried by the arms 68 and 71 a toothed rack carried by the arm 69. These racks are spaced apart longitudinally so that the teeth on the arms are not contiguous. The arm 68 has the adjusting pin 58 pivoted to it at 72. This pin 58 is provided with a tooth 73 having a spring 74 bearing upon it to maintain it in a recess 75 as shown. 76 is another recess for adjustment of the device. The arms 68 and 69 are connected together by a connection 77 slidable in the lateral slot 66. 78 is a lug on the arm 68 slidable in the slot 67, and 79 and 80 are lugs on the arm 69 slidable in the slot 65.

81 represents a gear wheel journaled in the casing 57 and provided with teeth 82 and 83 adapted to mesh with the gears 70 and 71. 84 is a lateral projection on the gear 81 adapted to engage the stop 85 on the casing 57. 86 shows a helical spring adapted to return the gear 81 after being rotated by the racks 70 and 71. The plate 62 terminates in a stem 87 encircled by a spring 88. Stem 87 co-acts with a plunger 89 operating the wire 54 in a casing 90. On the opposite side of the gear 81 from the plate 62 is a rod 91 provided with a rack 92 maintained extended by means of a spring 93. This rod terminates in a stem 94 encircled by a spring 95 co-acting with a plunger 96 operating the wire 54' in a casing 97.

I may provide a pivoted guard 98 to cover and protect the push rods 60 and 61 when not in use, as shown in Fig. 1.

The operation of the device is as follows: The film is inserted in the camera in the usual manner and the free end thereof threaded into the spool 16. The handle 20 is moved to vertical position which disengages the clutch 22 from the clutch 23 by depressing shaft 19 so that when the shaft 19 is rotated, the drum 24 remains stationary. Rotation of the shaft 19 rotates the spool 16 which brings the first film into place as is usual. Then the camera is prepared for taking the picture as is customary. The picture is taken by operating push rod 60 which operates the shutter. Referring to Fig. 4, when the push rod 60 is operated, the camera will take a snap shot. Inward movement of the rod 60 and the plate 62 through the medium of the plunger 89 will cause the shutter to open and close and the spring 88 will cause the return of the plate and the rod to initial position. Inward movement of the plate through the rack 71 and the teeth 83 on the gear wheel 81 will cause the latter to rotate in a clockwise direction (looking at Fig. 3) until the lug 84 engages the stop 85. This will prevent the operation of the rod 60 and the shutter again until the film has been changed. The rack 92 on the rod 91 engages the gear wheel 81 to maintain it against the pressure of the spring 86 in this locking position. Then if the push rod 61 is moved inwardly, the rack 92 will ride over the teeth on the wheel 81 because of the spring 93 until the rack is free from the wheel whereupon the spring 86 will return the wheel to initial position, as shown in Fig. 3. The spring 94 will cause the rod 91 to be moved back again until the rack 92 engages the wheel 81. When the rod 60 is moved in again, rotation of the wheel 81 thereby will extend the rod 61 to its full outward position.

When the rod 91 is pushed in, the plunger 96 will cause the collar 53 in Fig. 2, to be pushed inwardly so that the stem 52 pushes the plate 49 to the left so that the lug 50 will be disengaged from the dog 39 of the wheel 36. This will permit the spring 35 to rotate the drum 24 which, through the medium of the tape 34, will cause the winding up on the spool 16 of the exposed film and the unwinding of a new film. This winding and unwinding is controlled by the wheel 36. This wheel is of such a size that its circumference is equal to the length of the film, so that one rotation thereof will take one film away and bring a new one in place. As soon as the plate 49 moves to the left and frees the lug 50 from the dog 39 the spring 56 returns the stem 52 and the slide 49 so that the lug 50 returns to its initial position and acts as a stop for the dog 39 to engage whereby one revolution is made. If desired, the lug 51 is provided so that the wheel 36 may be stopped first at a half revolution and then at a full one.

The spring 35 is strong enough and the tape 34 is long enough so that one winding will be sufficient to move all the films of the spool into place. The drum 32 is loosely journaled on the shaft 27 so that to wind the spring, the handle 28 is moved to a vertical position which depresses clutch member 33 to engage with the clutch member 31 so that the drum 32 is rotated and the spring wound. Movement of the tape in this winding direction moves the wheel 36, which movement is permitted by the pivoted dog 39 which will pivotally move to a flush position when it is engaged by the lugs 50 or 51.

If instead of a snap shot as above described, it is desired to take a time picture, the pin 58, Fig. 4, is pivotally moved to disengage the finger 73 from the notch 75 whereupon the member 68, 77 and 69 is slid to the right until the finger 73 engages the notch 76. In this position, movement of the push rod 60 will only open the shutter because the rack 70 is only half the length of the rack 71 so that only half a revolution of the wheel 81 takes place at a time. The rod 61 must be pushed again to cause a closing of the shutter. The spring 88 will return the plate 62 to the right and the rod must be pushed again to close the shutter.

What I claim is:

1. A camera including a shutter, shutter operating mechanism, hand pressure means for actuating said mechanism, a casing independent of the camera housing said hand means, and means carried by said casing for controlling the exposure character of said shutter.

2. A film camera including a shutter, shutter operating mechanism, hand pressure means for actuating said mechanism, a casing independent of the camera housing said hand means, and means carried by said casing for preventing a second opening of the shutter until the film exposed to the first opening has been changed said means comprising channeled plates, racks in said channels, and a gear co-acting with said racks.

3. A film camera provided with film spools, including spring means connected to the spool to be filled with the exposed film, a drum connected to the unexposed film spool, and a metal tape operatively connecting the spring means with the drum whereby a predetermined amount of film may be fed into operative position.

4. A film camera provided with film spools, including spring means connected to the spool to be filled with the exposed film, a drum connected to the unexposed film spool, a metal tape operatively connecting the spring means with the drum and means between the spools for permitting intermittent movement of a predetermined amount of said tape whereby a predetermined amount of film may be fed into operative position.

5. A film camera including a shutter, hand pressure operated actuating mechanism therefor, hand pressure actuated film feeding mechanism independent of said previous hand means, a casing adapted to house said hand means, and means in said casing for connecting both of said hand means whereby the film feeding mechanism may lock the shutter mechanism.

6. A film camera including a shutter, hand pressure operated actuating mechanism therefor, hand pressure actuated film feeding mechanism independent of said previous hand means, a casing adapted to house said hand means, and means in said casing for connecting both of said hand means whereby one means may automatically lock and unlock the other.

7. A film camera including a shutter, hand pressure operated actuating mechanism therefor, hand pressure actuated film feeding mechanism, a casing adapted to house said hand means, and means in said casing operated by the film feeding mechanism for automatically locking and unlocking the shutter mechanism comprising teeth adjustably carried on said means in the casing and a gear co-acting therewith.

8. A film camera including a shutter, hand pressure operated actuating mechanism therefor, hand pressure actuated film feeding mechanism, a casing adapted to house said hand means, and means in said casing operated by the film feeding mechanism for automatically locking and unlocking the shutter mechanism comprising teeth on said means in the casing and a spring actuated gear co-acting therewith.

9. A film camera including a shutter, hand pressure operated actuating mechanism therefor, hand pressure actuated film feeding mechanism, a casing adapted to house said hand means, and means in said casing operated by the film feeding mechanism for automatically locking and unlocking the shutter mechanism comprising slidably toothed racks on said means in the casing and a gear therebetween co-acting therewith.

10. A camera including a shutter, shutter operating mechanism, hand pressure means for actuating said mechanism, a casing independent of the camera housing said hand means, and means carried by said casing for controlling the exposure character of said shutter comprising a spring pressed channeled plate, racks slidable in said channels and a spring pressed gear co-acting with said racks.

11. A camera including a shutter, shutter operating mechanism, hand pressure means for actuating said mechanism, a casing independent of the camera housing said hand means, and means carried by said casing for controlling the exposure character of said shutter comprising a spring pressed channeled plate, racks slidable in said channels, a spring pressed gear co-acting with said racks, and means external of said casing for moving said racks.

12. A camera including a shutter, shutter operating mechanism, hand pressure means for actuating said mechanism, a casing independent of the camera housing said hand means, and means carried by said casing for controlling the exposure character of said shutter comprising a spring pressed channeled plate, racks slidable in said channels, a spring pressed gear co-acting with said racks, and a pivoted lever for moving said racks.

13. A film camera provided with film spools, including spring means connected to the spool to be filled with the exposed film, a drum connected to the unexposed film spool, a perforated metal tape operatively connecting the spring means with the drum, and tooth means co-acting with the perforated tape for permitting intermittent movement of a predetermined amount of film to be fed into operative position.

HOMER H. HECKMAN.